US011773209B2

(12) United States Patent
Rogers et al.

(10) Patent No.: US 11,773,209 B2
(45) Date of Patent: Oct. 3, 2023

(54) QUINONE-CONTAINING POLY(ARYLENE), METHODS FOR THE MANUFACTURE THEREOF, AND USE FOR ELECTROCHEMICAL GAS SEPARATION

(71) Applicant: Verdox, Inc, Woburn, MA (US)

(72) Inventors: Cameron Rogers, Malden, MA (US); Sahag Voskian, Boston, MA (US)

(73) Assignee: VERDOX, INC, Woburn, MA (US)

( * ) Notice: Subject to any disclaimer, the term of this patent is extended or adjusted under 35 U.S.C. 154(b) by 0 days.

(21) Appl. No.: 17/470,632

(22) Filed: Sep. 9, 2021

(65) Prior Publication Data

US 2022/0145002 A1    May 12, 2022

Related U.S. Application Data

(60) Provisional application No. 63/111,752, filed on Nov. 10, 2020.

(51) Int. Cl.
  *C08G 61/12* (2006.01)
  *B01D 53/02* (2006.01)
  *B01D 53/32* (2006.01)

(52) U.S. Cl.
  CPC .......... *C08G 61/121* (2013.01); *B01D 53/02* (2013.01); *B01D 53/326* (2013.01); *B01D 2253/202* (2013.01); *C08G 2261/12* (2013.01); *C08G 2261/314* (2013.01)

(58) Field of Classification Search
  CPC .............. C08G 61/121; C08G 2261/12; C08G 2261/314; B01D 53/02; B01D 53/326; B01D 2253/202
  See application file for complete search history.

(56) References Cited

U.S. PATENT DOCUMENTS

| 3,394,106 A | 7/1968 | Anderson et al. | |
|---|---|---|---|
| 10,464,018 B2 | 11/2019 | Voskian et al. | |
| 11,219,858 B2 | 1/2022 | Voskian et al. | |
| 11,298,653 B2 | 4/2022 | Voskian et al. | |
| 2002/0033333 A1* | 3/2002 | Riecke | B01D 53/326 204/266 |
| 2002/0037428 A1* | 3/2002 | Koch | C08G 61/125 428/690 |
| 2002/0191270 A1* | 12/2002 | Lu | G02F 1/15165 359/272 |
| 2005/0231785 A1* | 10/2005 | Oh | B24B 37/04 359/265 |
| 2007/0110726 A1* | 5/2007 | Subbiah | A01N 63/30 424/93.5 |
| 2007/0139862 A1* | 6/2007 | Tateishi | H01G 11/58 361/502 |
| 2008/0286645 A1* | 11/2008 | Nobuta | H01M 10/36 252/511 |
| 2014/0065490 A1 | 3/2014 | Otsuka et al. | |
| 2015/0194665 A1 | 7/2015 | Ohtsuka et al. | |
| 2017/0113182 A1* | 4/2017 | Voskian | B01D 53/326 |
| 2021/0062351 A1 | 3/2021 | Voskian et al. | |
| 2021/0387139 A1 | 12/2021 | Voskian et al. | |
| 2022/0040632 A1 | 2/2022 | Voskian et al. | |
| 2022/0184552 A1 | 6/2022 | Voskian et al. | |

FOREIGN PATENT DOCUMENTS

| JP | S59196573 A | * 11/1984 | ............... H01M 4/60 |
|---|---|---|---|
| JP | 2007304389 A | * 11/2007 | ............... G02F 1/15 |

OTHER PUBLICATIONS

PTO 158023 (USPTO translation of Kobayashi) (Year: 1984).*
Mezhikovsky et al. (The Investigation of Thermostability of Poly (Sulfophenylene Quinones, Institute of Chemical Physics, Academy of Sciences of the USSR, Moscow, 1972, p. 217-223) (Year: 1972).*
Rao et al. (1975, Synthesis of benzoquinone-1, 4-aldehyde diacetate. The Journal of Organic Chemistry, 40(17), 2548-2549). (Year: 1975).*
Paraskevas et al. (1988). Oxidation of hydroquinones with oxygen in the presence of bis (1,3-propanediaminato) copper (II) chloride. Synthesis, 1988(11), 897-899) (Year: 1988).*
JP2007304389A_ENG (Espacenet machine translation of Sawada) (Year: 2007).*
Paraskevas et al. (1988). Oxidation of hydroquinones with oxygen in the presence of bis (1,3-propanediaminato) copper (II) chloride. Synthesis, 1988(11), 897-899, provided as non-patent literature on Aug. 8, 2022) (Year: 1988).*
JP2007304389A_ENG (Espacenet machine translation to Sawada) (Year: 2007).*
International Search Report for the corresponding International Application No. PCT/US2021/049643; International Filing date: Sep. 9, 2021; dated Dec. 16, 2021; 3 pages.
Mezhikovsky, S. M., et al., "The Investigation of Thermostability of Poly(Sulfophenylene Quinones", Chem. zvesti, vol. 26, 1972; pp. 217-223.
Vlad, A. et al., "Exploring the potential of polymer battery cathodes with electrically conducive molecular backbone", Journal of Material Chemistry A, vol. 3, 2012; 7 pages.
Written Opinion for the corresponding International Application No. PCT/US2021/049643; International Filing date: Sep. 9, 2021; dated Dec. 16, 2021; 8 pages.
Chen et al., "One-step Synthesis of Polyhydroquinone-Graphene Hydrogel Composites for High Performance Supercapacitors," Journal of Materials Chemistry A, Accepted Manuscript, 2013; 9 pages.

(Continued)

*Primary Examiner* — Gabriel E Gitman

(74) *Attorney, Agent, or Firm* — CANTOR COLBURN LLP

(57) ABSTRACT

A quinone-containing poly(arylene) includes repeating units of formula (I), (II), (III), (IV), (V), or (VI) as defined herein. The quinone-containing poly(arylene) can be useful in composites, electrode assemblies, electrochemical cells, gas separation systems, energy storage devices, and electrochromic devices.

28 Claims, No Drawings

(56) References Cited

OTHER PUBLICATIONS

Madkour, T., "Chemistry of Polymerization Products of p-Benzoquinone. C NMR and Molecular Dynamics Study," Polymer Journal, vol. 29, No. 8, 1997; pp. 670-677.

Saaba et al., "Polymerization Products of p-Benzoquinone as Bound Antioxidants for Styrene-Butadiene Rubber: Part I—Preparation of Quinone Polymers", Polymer Degradation and Stability, vol. 22, 1988; pp. 195-203.

* cited by examiner

QUINONE-CONTAINING POLY(ARYLENE), METHODS FOR THE MANUFACTURE THEREOF, AND USE FOR ELECTROCHEMICAL GAS SEPARATION

CROSS-REFERENCE TO RELATED APPLICATION

This application claims priority to U.S. Provisional Application No. 63/111,752, filed Nov. 10, 2020, the content of which is incorporated by reference herein in its entirety.

FEDERAL RESEARCH STATEMENT

This invention was made with government support under award number DE-AR0001248 awarded by the Advanced Research Projects Agency—Energy (ARPA-E). The government has certain rights in the invention.

BACKGROUND

Removing target species from gas mixtures has been the subject of much research and development. For example, there have been efforts to mitigate global warming by curbing carbon dioxide emissions. To this end, a number of approaches, such as thermal methods have been explored, to capture carbon dioxide at different stages of its production. Other potential applications of target gas removal include removing target gases directly from air or ventilated air.

Electroswing adsorption (ESA) is an alternative method of capturing a target gas from a gaseous mixture. Typically, the electrode in an electroswing adsorption cell includes an electrically conductive scaffold and an electroactive material. There remains a need for improved materials for electroswing adsorption, including improved methods of production.

SUMMARY

A quinone-containing poly(arylene) comprises repeating units of at least one of formulas (I) to (VI)

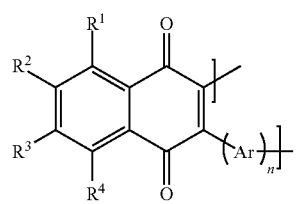

Formula (I)

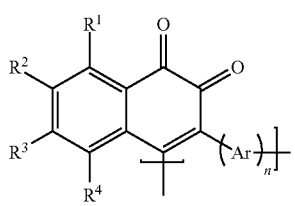

Formula (II)

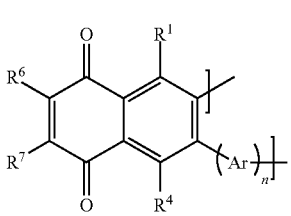

Formula (III)

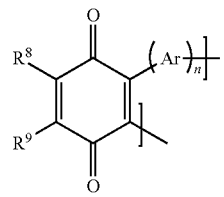

Formula (IV)

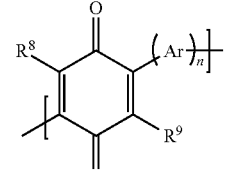

Formula (V)

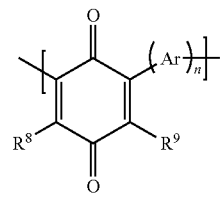

Formula (VI)

wherein $R^1$, $R^2$, $R^3$, $R^4$, $R^6$ and $R^7$ are independently at each occurrence hydrogen, halogen, a $C_{1-30}$ alkyl group, a $C_{1-30}$ alkoxy group, a poly($C_{1-30}$ alkylene oxide) group; a $C_{3-30}$ cycloalkyl group, a $C_{3-30}$ branched alkyl group, a $C_{6-30}$ aryl group, a $C_{3-30}$ heteroaryl group, a $C_{1-30}$ fluoroalkyl group, a nitrile group, a nitro group, a hydroxyl group, a carboxylic acid group, a thiol group, or a vinyl group; $R^8$ and $R^9$ are independently at each occurrence hydrogen, halogen, a $C_{1-30}$ alkyl group, a $C_{1-30}$ alkoxy group, a poly($C_{1-30}$ alkylene oxide) group; a $C_{3-30}$ cycloalkyl group, a $C_{3-30}$ branched alkyl group, a $C_{6-30}$ aryl group, a $C_{3-30}$ heteroaryl group, a $C_{1-30}$ fluoroalkyl group, a nitrile group, a nitro group, a hydroxyl group, a carboxylic acid group, a thiol group, or a vinyl group; and Ar is a substituted or unsubstituted $C_{6-20}$ arylene group, preferably a substituted or unsubstituted phenylene group or a substituted or unsubstituted 9,9-di($C_{1-12}$ alkyl)fluorene group.

A method of making the quinone-containing poly(arylene) comprises combining a dihalogenated naphthoquinone, a dihalogenated benzoquinone, or a combination thereof; and a substituted or unsubstituted $C_{6-20}$ aryl diboronic acid or diboronic ester; in the presence of a palladium catalyst under conditions effective to provide the quinone-containing poly(arylene).

A composite comprises the quinone-containing poly(arylene) disposed on a substrate.

An electrode assembly comprises a porous separator; and the composite.

An electrochemical cell comprises the composite.

A gas separation system comprises a plurality of electrochemical cells in fluid communication with a gas inlet and a gas outlet.

An energy storage device comprises the quinone-containing poly(arylene), the composite, or the electrochemical cell.

An electrochromic device comprising the quinone-containing poly(arylene), the composite, or the electrochemical cell.

The above described and other features are exemplified by the following detailed description.

DETAILED DESCRIPTION

Several redox-active polymers have been explored as electroactive materials, particularly those including quinone moieties, which can switch between oxidized and reduced states having differing affinities for a target gas. ESA has previously been demonstrated with quinone-containing poly(arylene) polymers prepared by Ni(0)-catalyzed Yamamoto polymerization, most notably including poly(1,4-anthraquinone). Poly(arylene)s exhibit desirable properties for ESA applications, including their conductivity (relative to non-conjugated polymers), stability, processability, and affinity for conductive substrates. However, Yamamoto polymerization can be nonpreferred for various reasons. For example, Yamomoto polymerizations can be prohibitively expensive.

Accordingly, there remains a need in the art for an alternative synthetic approach to enable the use of quinone-containing poly(arylene)s for ESA applications. The present inventors have unexpectedly discovered that certain quinone-containing poly(arylene)s can be particularly useful for a variety of applications, specifically for conducting electrochemical gas separations. Naphthoquinones and benzoquinones are of particular interest for incorporation into polymers. In part this is because of their favorable reduction potentials, which are generally less negative than those of anthraquinone or phenanthrenequinone derivatives. Additionally, benzoquinones and naphthoquinones include reactive sites which are not present in fully benzenoid structures like phenanthrenequinone or 9,10-anthraquinone; these sites offer synthetic reactivity distinct from that of an aryl position. Examples of this reactivity include highly selective bromination and a susceptibility to the Finkelstein reaction or direct cyanation. This reactivity enables efficient synthesis of multifunctional monomers. In a further advantageous feature, these sites also offer exceptional reactivity towards Suzuki cross-coupling reactions. For example, good yields can be achieved at room temperature with phosphine-free catalyst systems (e.g., $Pd(OAc)_2$).

The quinone-containing poly(arylene)s of the present disclosure can be particularly useful for a variety of electrochemical applications, including, but not limited to, energy storage, electrochromic applications, and gas separation. In a specific aspect, the quinone-containing poly(arylene)s can be used in electrode assemblies, electrochemical cells, and gas separation systems to separate a target gas (e.g., $CO_2$ or $SO_2$) from a gas mixture by an electrochemical process. Thus, a significant improvement is provided by the composition of the present disclosure.

Accordingly, an aspect of the present disclosure is a quinone-containing poly(arylene) (hereinafter referred to as a "polyquinone" for brevity). The polyquinone comprises repeating units of at least one of Formulas (I) to (VI):

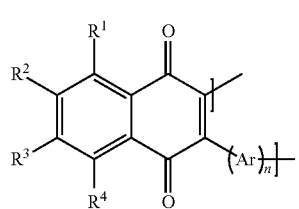

Formula (I)

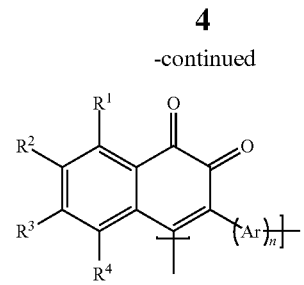

Formula (II)

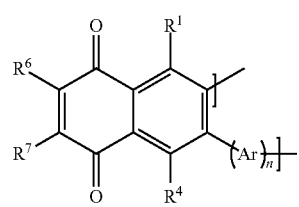

Formula (III)

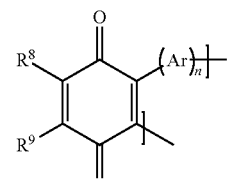

Formula (IV)

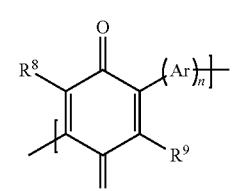

Formula (V)

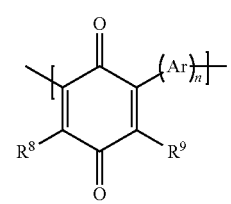

Formula (VI)

wherein $R^1$, $R^2$, $R^3$, $R^4$, $R^6$ and $R^7$ are independently at each occurrence hydrogen, halogen, a $C_{1-30}$ alkyl group, a $C_{1-30}$ alkoxy group, a poly($C_{1-30}$ alkylene oxide) group; a $C_{3-30}$ cycloalkyl group, a $C_{3-30}$ branched alkyl group, a $C_{6-30}$ aryl group, a $C_{3-30}$ heteroaryl group, a $C_{1-30}$ fluoroalkyl group, a nitrile group, a nitro group, a hydroxyl group, a carboxylic acid group, a thiol group, or a vinyl group, preferably hydrogen, halogen, a $C_{1-6}$ alkyl group, a $C_{1-6}$ alkoxy group, a nitrile group, a nitro group, a hydroxyl group, a carboxylic acid group, a thiol group, or a vinyl group; $R^8$ and $R^9$ are independently at each occurrence hydrogen, halogen, a $C_{1-30}$ alkyl group, a $C_{1-30}$ alkoxy group, a poly($C_{1-30}$ alkylene oxide) group; a $C_{3-30}$ cycloalkyl group, a $C_{3-30}$ branched alkyl group, a $C_{6-30}$ aryl group, a $C_{3-30}$ heteroaryl group, a $C_{1-30}$ fluoroalkyl group, a nitrile group, a nitro group, a hydroxyl group, a carboxylic acid group, a thiol group, or a vinyl group, preferably hydrogen, halogen, a $C_{1-6}$ alkyl group, a $C_{1-6}$ alkoxy group, a nitrile group, a nitro group, a hydroxyl group, a carboxylic acid group, a thiol group, or a vinyl group; Ar is a substituted or unsubstituted $C_{6-20}$ arylene group, preferably a substituted or unsubstituted phenylene group or a substituted or unsubstituted 9,9-di($C_{1-12}$ alkyl)fluorene group; and n is 0 or 1.

When present, the Ar group can be, for example, a substituted or unsubstituted phenylene, biphenylene, fluorene, thiophene, or a combination thereof. In an aspect, Ar can preferably be a substituted or unsubstituted phenylene group, and the polyquinone comprises repeating units of at least one of formulas (Ia) to (VIa)

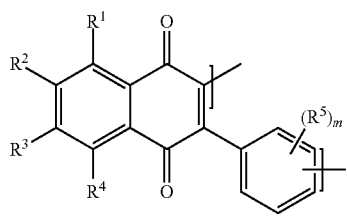

Formula (Ia)

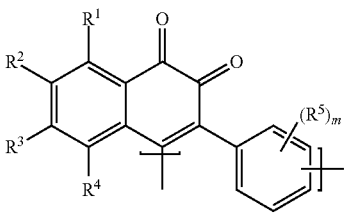

Formula (IIa)

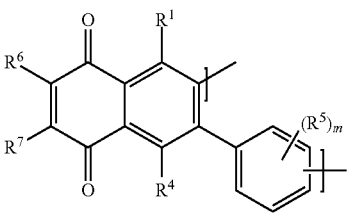

Formula (IIIa)

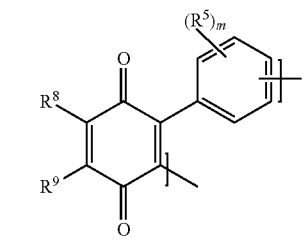

Formula (IVa)

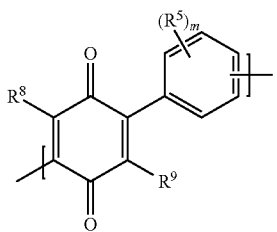

Formula (Va)

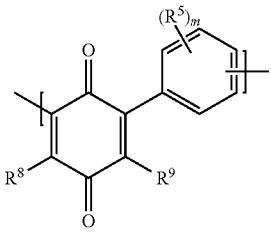

Formula (VIa)

wherein $R^1$, $R^2$, $R^3$, $R^4$, $R^6$ and $R^7$ are independently at each occurrence hydrogen, halogen, a $C_{1-6}$ alkyl group, a $C_{1-6}$ alkoxy group, a nitrile group, a nitro group, a hydroxyl group, a carboxylic acid group, a thiol group, or a vinyl group; $R^5$ is independently at each occurrence halogen, a $C_{1-6}$ alkyl group, a $C_{1-6}$ alkoxy group, a nitrile group, a nitro group, a hydroxyl group, a carboxylic acid group, a thiol group, or a vinyl group; $R^8$ and $R^9$ are independently at each occurrence hydrogen, halogen, a $C_{1-6}$ alkyl group, a $C_{1-6}$ alkoxy group, a nitrile group, a nitro group, a hydroxyl group, a carboxylic acid group, a thiol group, or a vinyl group; and m is 0 to 4. It will be understood that when m is 0, the valence of the phenyl ring is filled by hydrogen.

In an aspect, the polyquinone comprises repeating units according to at least one of Formula (I) and (II), wherein each of $R^1$, $R^2$, $R^3$, and $R^4$ is hydrogen and when n is 1, Ar is a phenyl group and m is 0.

In an aspect, the polyquinone comprises repeating units according to Formula (III), wherein $R^6$ and $R^7$ are cyano and when n is 1, Ar is a phenyl group and m is 0.

In an aspect, the polyquinone comprises repeating units according to at least one of Formula (IV), (V), and (VI), wherein $R^8$ and $R^9$ are $C_{1-6}$ alkyl groups, preferably methyl groups, and when n is 1, Ar is a phenyl group and m is 0.

The polyquinone is a polymer which, as defined herein, includes at least 5 repeating units according to at least one of Formulas (I)-(VI), preferably at least 10 repeating units according to at least one of Formulas (I)-(VI). In an aspect, the polyquinone comprises at least 10 repeating units according to at least one of Formulas (I)-(VI), for example 5 to 100 repeating units, or 10 to 100 repeating units, or 10 to 75 repeating units, or 10 to 50 repeating units, or 10 to 30 repeating units or 10 to 25 repeating units.

In an aspect, at least 50 mole percent, or at least 75 mole percent, or at least 80 mole percent, or at least 90 mole percent, or at least 95 mole percent, or at least 99 mole percent, e.g., 50 mole percent to 99.9 mole percent, or 75 mole percent to 95 mole percent, of the repeating units are according to at least one of Formulas (I)-(VI). In an aspect, the polyquinone is a homopolymer consisting of repeating units according to Formula (I), (II), (III), (IV), (V), or (VI).

The polyquinone can have a number average molecular weight of 1,000 to 200,000 grams per mole, or 10,000 to 200,000 grams per mole, preferably 10,000 to 100,000 grams per mole, more preferably 10,000 to 75,000 grams per mole, even more preferably 20,000 to 50,000 grams per mole. In an aspect, the polyquinone can have a number average molecular weight of 1,000 to 50,000 grams per mole, or 1,000 to 25,000 grams per mole, or 1,000 to 10,000 grams per mole. Molecular weight can be determined, for example, using gel permeation chromatography (GPC) in tetrahydrofuran relative to polystyrene standards.

The polyquinone can be made by methods that are generally known for preparing arylene polymers. For example, the polyquinone can be prepared by Suzuki polycondensation. A person of ordinary skill in the art will recognize that when n is 1 in the formulas above, the Suzuki polycondensation is of the "AA-BB" type, in which a dihalogenated naphthoquinone, a dihalogenated benzoquinone, or a combination thereof (i.e., an "AA" type monomer), is reacted with an aryl diboronic acid or an aryl diboronic ester. Conversely, a naphthoquinone or benzoquinone diboronic acid or ester can be reacted with a dihalogenated aryl group. In contrast, when n is 0, the Suzuki polycondensation is of the "AB" type, in which the naphthoquinone or the benzoquinone includes both the requisite halogen and boronic acid or ester functional groups. Thus, no aryl comonomer is needed and n is 0.

In an aspect, the method of making the polyquinone comprises combining a dihalogenated naphthoquinone, a dihalogenated benzoquinone, or a combination thereof; and a benzene diboronic acid or a benzene diboronic ester.

Suitable dihalogenated naphthoquinone and benzoquinone monomers can be readily selected by one of ordinary skill in the art and can include, for example, 2,3-dibromo-1,4-naphthoquinone, 2,3-dichloro-1,4-naphthoquinone, 2,3-diiodo-1,4-naphthoquinone, 2,3-dibromo-1,4-benzoquinone, 2,5-dibromo-1,4-benzoquinone, 2,6-dibromo-1,4-benzoquinone, 6,7-dicyano-2,3-dibromo-1,4-naphthoquinone, 2,3-dichloro-1,4-benzoquinone, 2,5-dichloro-1,4-benzoquinone, 2,6-dichloro-1,4-benzoquinone, 2,3-diiodo-1,4-benzoquinone, 2,5-diiodo-1,4-benzoquinone, or 2,6-diiodo-1,4-benzoquinone. Other isomers are also contemplated.

Suitable aryl diboronic acid or an aryl diboronic ester can also be readily selected by one of ordinary skill in the art, and can include, for example, a diboronic acid or a diboronic ester of a phenylene group, a biphenylene group, a fluorene group, a thiophene group, or a combination thereof. In an aspect, the aryl diboronic acid or aryl diboronic ester can be benzene-1,4-diboronic acid or benzene-1,4-diboronic acid bis-pinacol ester. Other isomers are also contemplated, for example wherein the benzene ring can be 1,2- or 1,3-disubstituted rather than 1,4-disubstituted. It will be understood that the benzene ring of the diboronic acid or ester component can be substituted or unsubstituted, as described above.

The monomer components are contacted in the presence of a palladium catalyst. The catalyst can generally be any Pd(0) or Pd(II) precursor, including, but not limited to $Pd(PPh_3)_4$, $PdCl_2(PPh_3)_2$, $Pd_2dba_3$, $PdCl_2(dppf)$, and $Pd(OAc)_2$. Optionally, a phosphine ligand can be employed, for example, $PPh_3$, $P(o-tol)_3$, SPhos, and 1,1'-ferrocenediyl-bis(diphenylphosphine) (dppf).

Alternatively, the active catalytic species can comprise Pd nanoparticles, which can be formed in-situ from a Pd precursor such as $Pd(OAc)_2$, preferably in the absence of phosphine ligands. Alternatively, the polymerization can be conducted with Ni, for example $Ni(COD)_2$ or $NiCl_2(dppf)$. In an aspect, use of Ni or phosphine-free Pd catalysts can be preferred.

In an aspect, the catalyst loading can range from 0.1 to 10 mole percent, for example 1 and 3 mole percent, preferably 1 mole percent, relative to the total molar amount of monomer.

The method can be carried out in a solvent, preferably a biphasic solvent system. The biphasic solvent system comprises water and an organic solvent, for example 1,4-dioxane, dimethylformamide (DMF), tetrahydrofuran (THF), toluene, xylene, or a combination thereof.

In an aspect, the polymerization can be conducted in the presence of an inorganic base, for example $K_2CO_3$ or $K_3PO_4$.

The conditions effective to provide the polyquinone can include a temperature of 17 to 130° C., and a time of 1 to 80 hours, preferably 8 to 72 hours.

In a specific aspect, the method can be conducted in a mixture of 1,4-dioxane and water, the catalyst is $Pd(OAc)_2$, the base is $K_2CO_3$, and the reaction is heated to 100° C. for 36 hours. Polymer products can be characterized by nuclear magnetic resonance (NMR) spectroscopy, ultraviolet (UV)-visible spectroscopy, infrared (IR) spectroscopy, gel permeation chromatography (GPC), and by electrochemical analyses such as cyclic voltammetry, either in solution or following deposition on an electrode.

The quinone-containing poly(arylene)s of the present disclosure can be particularly useful for a variety of electrochemical applications. For example, the quinone-containing poly(arylene)s described herein can be useful for energy storage, electrochromic application, catalysis, and gas separation.

A composite comprising the polyquinone represents another aspect of the present disclosure. The composite can comprise the polyquinone as described above disposed on a substrate. The polyquinone can be disposed on at least a portion of a surface of the substrate. In an aspect, the substrate can be impregnated with the polyquinone. In an aspect, one or more intervening layers can be positioned between the substrate and the polyquinone. In an aspect, no intervening layers are present and the polyquinone can be disposed directly on a surface of the substrate. In an aspect, the substrate can comprise a carbonaceous material. Exemplary carbonaceous material can include, but are not limited to, carbon paper (treated, TEFLON-treated, or untreated), carbon cloth, nonwoven carbon mat, or a nonwoven carbon nanotube mat.

The composite can optionally be porous. For example the composite can have a porosity of at least 20%, preferably 30 to 60%.

The composite can comprise the polyquinone in an amount of 10 to 90 weight percent, based on the total weight of the composite. Within this range, the polyquinone can be present in an amount of at least 20 weight percent, or at least 25 weight percent, or at least 30 weight percent, or least 40 weight percent, or at least 50 weight percent, based on the total weight of the composite. Also within this range, the polyquinone can be present in an amount of at most 80 weight percent, or at most 70 weight percent, or at most 60 weight percent, or at most 50 weight percent, or at most 45 weight percent, or at most 40 weight percent. For example, the polyquinone can be present in an amount of 10 to 75 weight percent, or 10 to 60 weight percent, or 15 to 60 weight percent, or 20 to 55 weight percent, or 25 to 55 weight percent, or 30 to 50 weight percent, based on the total weight of the composite.

An electrode assembly represents another aspect of the present disclosure. In an aspect, the electrode assembly comprises the composite as described above and a porous separator. The composite can be disposed on the porous separator, optionally with one or more intervening layers disposed between the composite and the porous separator. In an aspect the composite can be laminated to the porous separator. The porous separator can comprise any suitable material. In an aspect, the porous separator can comprise a polymer film, for example a film comprising a polyamide, a polyolefin, a polyaramid, a polyester, a polyurethane, an acrylic resin, and the like, or a combination thereof. The polymer may be coated on one or both sides with ceramic nanoparticles. In an aspect, the porous separator can comprise cellulose, a synthetic polymeric material, or a polymer/ceramic composite material. Further examples of separators can include polyvinylidene difluoride (PVDF) separators, polytetrafluoroethylene (PTFE), PVDF-alumina composite separators, and the like.

An electrochemical cell comprising the composite represents another aspect of the present disclosure. The electrochemical cell comprises a first electrode comprising the above-described composite comprising the polyquinone, a second electrode comprising a complementary electroactive composite layer, and a first separator between the first electrode and the second electrode.

The separator can be as described above for the electrode assembly. The separator can serve as a protective layer that can prevent the respective electrochemical reactions at each electrode from interfering with each other. The separator can also help electronically isolate the first and second electrodes from one another or from other components within the electrochemical cell to prevent a short-circuit. A person of ordinary skill, with the benefit of this disclosure, would be able to select a suitable separator.

The electrochemical cell can further comprise an electrolyte. The electrolyte can have a suitable conductivity at room temperature (e.g., 23° C.). In an aspect the separator can be partially or completely impregnated with the electrolyte. Impregnating the separator with the electrolyte can be by submerging, coating, dipping, or otherwise contacting the separator with the electrolyte. Some or all of the pores of the porous separator can be partially or completely filled with the electrolyte. In an aspect, the separator can be saturated with the electrolyte.

In an aspect the electrolyte comprises an ionic liquid, for example a room temperature ionic liquid (RTIL). Ionic liquids can have low volatility, for example a vapor pressure of less than $10^{-5}$ Pa, or $10^{-10}$ to $10^{-5}$ Pa at a temperature of 23° C., which can reduce the risk of the separator drying out, and allow for reduction in loss of the electrolyte due to evaporation of entrainment. In an aspect the ionic liquid accounts for substantially all (e.g., at least 80 volume percent, or at least 90 volume percent, or at least 95 volume percent, or at least 98 volume percent, at least 99 volume percent, or at least 99.9 volume percent) of the electrolyte.

The ionic liquid comprises an anion component and a cation component. The anion of the ionic liquid can comprise, but is not limited to halide, sulfate, sulfonate, carbonate, bicarbonate, phosphate, nitrate, nitrate, acetate, $PF_6$, $BF_4$, triflate, nonaflate, bis(trifluoromethylsulfonyl)amide, trifluoroacetate, heptafluorobutanoate, haloaluminate, triazolide, or an amino acid derivative (e.g., proline with the proton on the nitrogen removed).

The cation of the ionic liquid can comprise one or more of, but is not limited to, imidazolium, pyridinium, pyrrolidinium, phosphonium, ammonium, sulfonium, thiazolium, pyrazolium, piperidinium, triazolium, pyrazolium, oxazolium, guanadinium, an alkali cation, or dialkylmorpholinium. In an aspect, the room temperature ionic liquid comprises an imidazolium as a cation component. In an aspect, the room temperature ionic liquid comprises 1-butyl-3-methylimidazolium ("Bmim") as a cation component. In an aspect, the room temperature ionic liquid comprises bis(trifluoromethylsulfonyl)imide ("TFSI") as an anion component. In an aspect, the room temperature ionic liquid comprises 1-butyl-3-methylimidazolium bis(trifluoromethylsulfonyl)imide ("[Bmim][TFSI]"). In an aspect, the room temperature ionic liquid comprises 1-butyl-3-methylimidazolium tetrafluoroborate ("$BF_4$") ("[Bmim][$BF_4$]").

The second electrode of the electrochemical cell comprises a complementary electroactive composite layer. The complementary electroactive composite layer can be the same or different from the composite comprising the polyquinone of the present disclosure. The complementary electroactive composite layer comprises an electroactive species which can be the same or different as the polyquinone of the composite of the first electrode.

In an aspect, the complementary electroactive composite layer comprises the same polyquinone as the composite of the first electrode. In an aspect, the complementary electroactive composite layer comprises an electroactive species which is different from the polyquinone of the composite of the first electrode ("a second electroactive species"). The second electroactive species can serve as a source of electrons for the reduction of the first electroactive species present in the first electrode. Likewise, the second electroactive species may serve as a sink for electrons during oxidation of the first electroactive species. The second electroactive species can comprise, for example, polyvinyl ferrocene, poly(3-(4-fluorophenyl)thiophene), or other Faradaic redox species with a reduction potential at least 0.5 volts more positive that the first reduction potential of the first electroactive species (e.g., the polyquinone of the present disclosure).

In an aspect, the second electrode can further comprise a substrate, which can be positioned proximate to or between complementary electroactive composite layers. The substrate can be in direct or indirect contact with the complementary electroactive composite layer or layers. When present, the substrate can include, for example, carbon paper (treated, TEFLON-treated, or untreated), carbon cloth, nonwoven carbon mat, or a nonwoven carbon nanotube mat. In an aspect, the support can comprise the same carbonaceous material of the composite of the first electrode. In an aspect, the substrate of the second electrode can be a conductive material and act as a current collector within the electrochemical cell.

In an aspect, the first electrode can be a negative electrode, and the second electrode can be a positive electrode. The terms negative electrode and positive electrode are used for convenience and clarity, although they may be technically accurate only when the target gas is being acquired or released.

In an aspect, the second electrode can be positioned between first electrodes. Each of the first electrodes can comprise the disclosed composite. In an aspect the first electrodes and/or second electrodes can be identical in configuration or composition.

In an aspect, the electrochemical cell comprises a single separator, disposed between the first electrode and the second electrode, e.g., between the negative electrode and the positive electrode. Electrochemical cells can be combined to make a stack in any suitable combination of parallel and series configurations. In an aspect, the electrochemical cell can comprise more than one separator. For example, one of skill in the art would understand that depending on the selected combination of series and parallel configurations, a single separator may be used, or a plurality of separators may be preferred.

The electrochemical cell can optionally further comprise a gas permeable layer. The gas permeable layer can be positioned adjacent to the first electrode, on a side opposite the separator. The gas permeable layer can comprise a conductive solid material and act as a current collector within the cell. The gas permeable layer can comprise a porous material. In an aspect, the gas permeable layer has a porosity, for example, of greater than or equal to 60%, greater than or equal to 70%, greater than or equal to the 75%, greater than or equal to 80%, or greater. In an aspect, the gas permeable layer has a porosity of less than or equal to 85%, less than or equal to 90%, or more. Combinations of these ranges are possible. For example, in an aspect, the gas permeable layer of the first electrode has a porosity of greater than or equal to 60% and less than or equal to 90%. Other porosities are also possible. Examples of suitable materials for the gas permeable layer include, without limitation, carbon paper (treated, TEFLON-treated, or untreated), carbon cloth, and nonwoven carbon mat.

The electrochemical cell can optionally further comprise a gas flow field. The gas flow field, when present, can be positioned adjacent to the gas permeable layer, on a side opposite the first electrode. When the gas permeable layer is not present in the electrochemical cell, the gas flow field can be positioned adjacent to the first electrode, on a side opposite the separator.

The polyquinone of the present disclosure can be reactive towards a target gas. The target gas is an electrophilic molecule. In an aspect, the target gas is a Lewis acid gas. The target gas is capable of forming a complex or an adduct with the poly(phenylnaphthoquinone) when the poly(phenylnaphthoquinone) is in a reduced state, for example, by bonding to the poly(phenylnaphthoquinone) in its reduced state. The target gas can comprise carbon dioxide ($CO_2$), a sulfur oxide species such as sulfur dioxide ($SO_2$) or sulfur trioxide ($SO_3$), an organosulfate ($R_2SO_4$, where each R is independently hydrogen, $C_{1-12}$ alkyl, or $C_{6-20}$ aryl) such as dimethyl sulfate, a nitrogen oxide species such as nitrogen dioxide ($NO_2$) or nitrogen trioxide ($NO_3$), a phosphate ester ($R_3PO_4$, where each R is independently hydrogen, $C_{1-12}$ alkyl, or $C_{6-20}$ aryl) such as trimethyl phosphate, an ester (RCOOR' where each R is independently hydrogen, $C_{1-12}$ alkyl, or $C_{6-20}$ aryl, and each R' is independently $C_{1-12}$ alkyl or $C_{6-20}$ aryl) such as methyl formate or methyl acrylate, an aldehyde (RCHO, where each R is independently hydrogen, $C_{1-12}$ alkyl, or $C_{6-20}$ aryl) such as formaldehyde or acrolein, a ketone ($R_2CO$, where each R is independently hydrogen, $C_{1-12}$ alkyl, or $C_{6-20}$ aryl) such as acetone, an isocyanate (RNCO, where each R is independently hydrogen, $C_{1-12}$ alkyl, or $C_{6-20}$ aryl, and each R' is independently $C_{1-12}$ alkyl or $C_{6-20}$ aryl) such as methyl isocyanate, isothiocyanate (RNCS, where each R is independently hydrogen, $C_{1-12}$ alkyl, or $C_{6-20}$ aryl, and each R' is independently $C_{1-12}$ alkyl or $C_{6-20}$ aryl), a borane ($BR_3$, where each R is independently hydrogen, $C_{1-12}$ alkyl, or $C_{6-20}$ aryl) such as trimethyl borane, or a borate ($R_3BO_3$, where each R is independently hydrogen, $C_{1-12}$ alkyl, or $C_{6-20}$ aryl) such as trimethyl borate. The target gas can optionally comprise a combination of any of the foregoing target gas species.

In an aspect, the polyquinone can have a binding constant with carbon dioxide of at least $10^1$ $M^{-1}$, preferably $10^1$ to $10^{20}$ $M^{-1}$, more preferably $10^3$ to $10^{20}$. In an aspect, a binding constant with carbon dioxide may be $10^3$ to $10^{20}$ $M^{-1}$, $10^5$ to $10^{18}$ $M^{-1}$, or 108 to $10^{15}$ $M^{-1}$.

As such, an electrochemical cell comprising the polyquinone can be particularly useful for the separation of a target gas from a gas mixture when the gas mixture is contacted with the electrochemical cell, and thus is particularly well suited for use in a gas separation system. The gas separation system comprises a plurality of electrochemical cells in fluid communication with a gas inlet and a gas outlet.

The gas mixture, also referred to as the input gas, can be at least partially separated upon exposure to the electrochemical cell. The gas mixture can be, for example, ambient air (e.g., air from an ambient environment, such as outdoor air). In an aspect, the gas separation system can be used for direct air capture. The systems and methods described herein can be useful for removing a target gas such as carbon dioxide directly from ambient air (e.g., to reduce greenhouse gas levels), without the need for any pre-concentration step. Certain aspects of the present disclosure can make the systems and methods described herein particularly useful for direct air capture (e.g., an ability to bond with a target gas while being thermodynamically disfavored from reacting with major components of ambient air, such as oxygen).

In an aspect, the concentration of the target gas in the gas mixture is relatively low, for example when the gas mixture is ambient air. For example, the concentration of the target gas in the gas mixture prior to exposure to the electrochemical cell can be less than or equal to 500 ppm, or less than or equal to 450 ppm, or less than or equal to 400 ppm, or less than or equal to 350 ppm, or less than or equal to 300 ppm, or less than or equal to 200 ppm. In an aspect, the concentration of the target gas in the gas mixture can be as low as 100 ppm, or as low as 50 ppm, or as low as 10 ppm.

In an aspect, the gas mixture (e.g., input gas mixture) is ventilated air. The ventilated air can be air in an enclosed or at least partially enclosed place (e.g., air being circulated in an enclosed place). Examples of places in which the gas mixture (e.g., ventilated air) can be located include, but are not limited to sealed buildings, partially ventilated places, car cabins, inhabited submersibles, air crafts, and the like.

The concentration of target gas in the ventilated air can be higher than ambient air but lower than concentrations typical for industrial processes. In an aspect, the concentration of the target gas in the gas mixture prior to exposure to the electrochemical cell is less than or equal to 5,000 ppm, or less than or equal to 4,000 ppm, or less than or equal to 2,000 ppm, or less than or equal to 1,000 ppm. In an aspect, the concentration of the target gas in the gas mixture (e.g., when it is ventilated air/air in enclosed spaces) is as low as 1,000 ppm, or as low as 800 ppm, or as low as 500 ppm, or as low as 200 ppm, or as low as 100 ppm, or as low as 10 ppm.

In an aspect, the gas mixture comprises oxygen gas (02). In an aspect, the gas mixture has a relatively high concentration of oxygen gas (e.g., prior to exposure to the electrochemical cell). Certain aspects of the systems and methods described herein (e.g., the choice of particular electroactive species, methods of handling gases in the system, etc.) can contribute to an ability to capture target gases in gas mixtures in which oxygen gas is present without deleterious interference. In an aspect, oxygen gas is present in the gas mixture (e.g., prior to exposure to the electrochemical cell) at a concentration of greater than or equal to 0 volume percent, or greater than or equal to 0.1 volume percent, or greater than or equal to 1 volume percent, or greater than or equal to 2 volume percent, or greater than or equal to 5 volume percent, or greater than or equal to 10 volume percent, or greater than or equal to 20 volume percent, or greater than or equal to 50 volume percent, or greater than or equal to 75 volume percent, or greater than or equal to 90 volume percent, greater than or equal to 95 volume percent. In an aspect, oxygen gas is present in the gas mixture at a concentration of less than or equal to 99 volume percent, or less than or equal to 95 volume percent, or less than or equal to 90 volume percent, or less than or equal to 75 volume percent, or less than or equal to 50 volume percent, or less than or equal to 25 volume percent, or less than or equal to 21 volume percent, or less than or equal to 10 volume percent, or less than or equal to 5 volume percent, or less than or equal to 2 volume percent.

In an aspect, the gas mixture comprises water vapor. The gas mixture can comprise water vapor for example, because it is or comprises ambient air or ventilated air. In an aspect, the gas mixture (e.g., prior to exposure to the electrochemical cell) has a relatively high relative humidity. For example, in an aspect, the gas mixture can have a relative humidity of greater than or equal to 0%, or greater than or equal to 5%, or greater than or equal to 10%, or greater than or equal to 25%, or greater than or equal to 50%, or greater than or equal to 75%, or greater than or equal to 90% at at least one temperature in the range of −50 to 140° C. In an aspect, the gas mixture can have a relative humidity of less than or equal to 100%, or less than or equal to 95%, or less than or equal to 90%, or less than or equal to 75%, or less than or equal to 50%, or less than or equal to 25%, or less than or equal to 10% at at least one temperature in the range of −50 to 140° C.

The target gas can be separated from the gas mixture in the gas separation system by applying a potential difference across the electrochemical cells of the gas separation system. One of ordinary skill, with the benefit of this disclosure, would understand how to apply a potential across the electrochemical cell. For example, the potential can be applied by connecting the negative electrode and the positive electrode to a suitable power source capable of polarizing the negative and positive electrodes. In an aspect the power supply can be a DC voltage. Nonlimiting examples of a suitable power source include batteries, power grids, regenerative power supplies (e.g., wind power generators, photovoltaic cells, tidal energy generators), generators, and the like, and combinations thereof.

The potential difference can be applied to the electrochemical cells during at least a portion of the time that a gas mixture is exposed to the electrochemical cell. In an aspect, the potential difference can be applied prior to exposing the gas mixture to the electrochemical cell.

Application of a positive voltage to the electrochemical cell, during a charging mode, results in a redox reaction at the negative electrode wherein the poly(phenylnaphthoquinone) is reduced. As discussed herein, the poly(phenylnaphthoquinone) is selected for having a higher affinity for the target gas when it is in a reduced state relative to when it is in an oxidized state. By reducing the poly(phenylnaphthoquinone) and passing a gas mixture across the first electrode, the target gas can bond to the poly(phenylnaphthoquinone). In this way the target gas can be removed from the gas mixture to provide a treated gas mixture (e.g., comprising a lesser amount of the target gas relative to the initial gas mixture).

The potential difference applied across the electrochemical cell, during the charge mode, can have a particular voltage. The potential difference applied across the electrochemical cell can depend, for example, on the reduction potential for the generation of at least one reduced state of the first electroactive species, as well as the standard potential for the interconversion between a reduced state and an oxidized state of the poly(phenylnaphthoquinone) in the second electrode. The voltage further includes the current multiplied by the stack electrochemical resistance. In an aspect, the potential difference is at least 0 V, or at least 0.1 V, or at least 0.2 V, or at least 0.5 V, or at least 0.8 V, or at least 1.0 V, or at least 1.5 V. In an aspect, the potential difference is less than or equal to 2.0 V, or less than or equal to 1.5 V, or less than or equal to 0.5 V, or less than or equal to 0.2 V.

In an aspect, for example when the polyquinone is a poly(phenylnaphthoquinone), the poly(phenylnaphthoquinone) can be reduced to at least one of its reduced states, for example, as shown below:

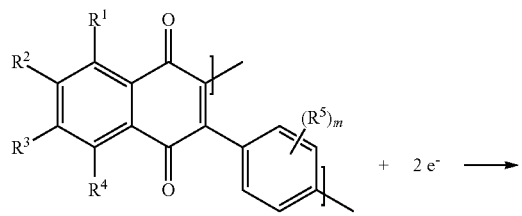

-continued

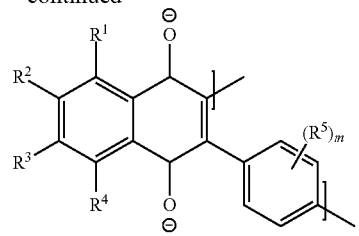

In an aspect, when the poly(phenylnaphthoquinone) is reduced in the presence of a target gas, for example carbon dioxide, the reduced form of the poly(phenylnaphthoquinone) can bond with the carbon dioxide:

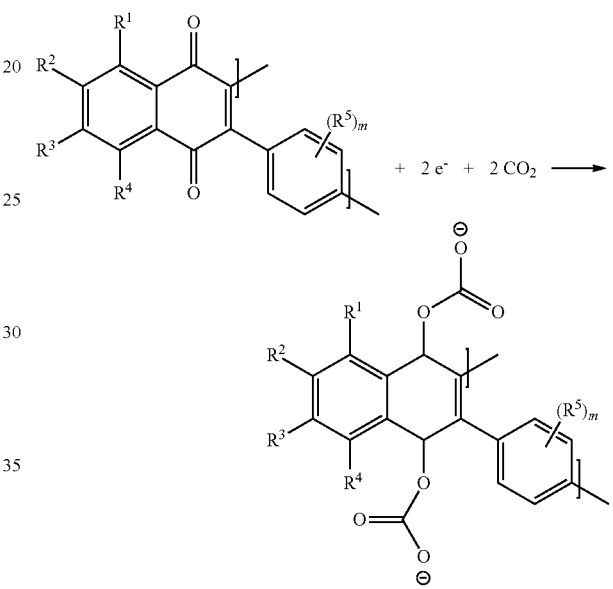

In an aspect, while the polyquinone is reduced at the first electrode, an electroactive species (e.g., a redox active polymer such as polyvinyl ferrocene) is being oxidized at the second electrode. During the charge mode, the oxidation of the electroactive species provides a source of electrons for driving the reduction of the polyquinone.

While the exemplary reaction shown above is shown taking place in one direction, it will be understood that some reversibility can be exhibited. Analogous reaction can take place with different electroactive species, as would be understood by a person of ordinary skill in the art.

In an aspect, a relatively large amount of the target gas is removed from the gas mixture during the processes described herein. Removing a relatively large amount of the target gas can, in some cases, be beneficial for any of a variety of applications, such as capturing gases that can be deleterious if released into the atmosphere for environmental reasons. For example, the target gas can comprise carbon dioxide, and removing a relatively high amount of the carbon dioxide from gas mixture can be beneficial to either limit the greenhouse gas impact of a process (e.g., an industrial process or transportation process) or to even reduce the amount of carbon dioxide in a room or the atmosphere (either for thermodynamic reasons for heating and air conditioning processes or for environmental reasons).

In an aspect the amount of target gas in a treated gas mixture (e.g., a gas mixture from which an amount of the target gas is removed upon being exposed to the electrochemical cell) is less than or equal to 50%, less than or equal to 25%, less than or equal to 10%, less than or equal to 5%, less than or equal to 2%, less than or equal to 1%, less than or equal to 0.5%, less than or equal to 0.1% of the amount (in volume percent) of the target gas in the original gas mixture prior to treatment (e.g., the amount of the target in the gas mixture prior to being exposed to electrochemical cell). In an aspect, the amount of target gas in a treated gas mixture is greater than or equal to 0.001%, greater than 0.005%, greater than or equal to 0.01%, greater than or equal to 0.05%, greater than or equal to 0.1%, greater than or equal to 0.5%, greater than or equal to 1%, greater than or equal to 2%, greater than or equal to 5% of the amount (in volume percent) of the target gas in the original gas mixture prior to treatment.

In an aspect, a second potential difference can be applied across the electrochemical cell after at least a portion of the target gas is bonded to the polyquinone. The second potential difference can be different than that first potential difference. In an aspect, applying the second potential difference results in a step of releasing a portion or all of the target gas bonded with the poly(phenylnaphthoquinone) to produce a second treated gas mixture. The second treated gas mixture can have a greater amount of the target gas than the input gas mixture. For example, target gas may be present in the second treated gas mixture in an amount such that its content is 10 volume percent (vol %), 20 vol %, 50 vol %, 100 vol %, 200 vol %, 1000 vol %, and/or up to 2,000 vol %, 5,000 vol %, 10,000 vol %, or more than the content in the first gas mixture.

The gas separation system can comprise an external circuit connecting the negative electrode and the positive electrode of each electrochemical cell to a power source configured to apply a potential difference across the negatives electrode and the positive electrode of each electrochemical cell. Each of the electrochemical cells of the gas separation system can be as described above. The electrochemical cells of the gas separation system can be stacked according to various configurations that are generally known in the art, including parallel or in series.

In an aspect, a gas separation system comprises a first set of electrochemical cells and a second set of electrochemical cells. Each of the first set and the second set can comprise one or more electrochemical cells as described throughout this disclosure. The first and second set can be made to run in parallel in an alternating fashion, such that one set of cells is operating in a charge mode and capturing a target gas (e.g., $CO_2$) from a gas mixture while another set of cells is operating in a discharge mode and releasing the target gas (e.g., $CO_2$). The system can comprise separate housings for each of the sets of electrochemical cells. The system can further comprise conduits and valving arranged to direct flow in a desired manner. The gas separation system can allow for nearly continuous separation of a gas mixture (e.g., gas stream), with the gas mixture being directed to the set of cells operating in a charge/capture mode, at a given moment, while a separate target gas-rich treated mixture is produced by the other set of cells operating in a discharge/release mode. Furthermore, additional sets of electrochemical cells may be added in parallel or in series, according to the needs of the application.

The gas mixture (e.g., a gas stream such as an input gas stream) can be introduced to the gas separation system at a particular flow rate. In an aspect, the flow rate can be greater than or equal to 0.001 liter per second (L/s), greater than or equal to 0.005 L/s greater than or equal to 0.01, greater than or equal to 0.05 L/s, greater than or equal to 0.1 L/s, greater than or equal to 0.5 L/s, greater than or equal to 1 L/s, greater than or equal to 5 L/s, greater than or equal to 10 L/s, greater than or equal to 10 50 L/s, or greater than or equal to 100 L/s. In an aspect, the flow rate of the gas mixture (e.g., a gas stream such as an input gas stream) can be less than or equal to 500 L/s, less than or equal to 400 L/s, less than or equal to 300 L/s, less than or equal to 200 L/s, less than or equal to 100 L/s, less than or equal to 50 L/s, less than or equal to 10 L/s, less than or equal to 1 L/s, less than or equal to 0.5 L/s, or less than or equal to 0.1 15 L/s. Suitable combinations of the foregoing ranges are mentioned.

In an aspect, during or after the step of releasing the target gas, the method further comprises applying a vacuum condition to the electrochemical cell to remove at least a portion or all of the released target gas from the electrochemical cell. One of ordinary skill, with the benefit of this disclosure, would understand suitable techniques and equipment for applying a vacuum condition to the electrochemical cell. For example, a vacuum pump can be fluidically connected to a gas outlet of the electrochemical cell. The vacuum pump can be operated to produce a negative pressure differential between the electrochemical cell bed and a downstream location. This vacuum condition can provide a force sufficient to cause target gas released during the releasing step described above to flow out of the electrochemical cell. The vacuum condition can be applied such that the pressure inside the electrochemical cell during or after the releasing of the target gas is less than or equal to 760 torr, less than or equal to 700 torr, less than or equal to 500 torr, less than or equal to 100 torr, less than or equal to 50 torr, less than or equal to 10 torr, and/or as low as 5 torr, as low as 1 torr, as low as 0.5 torr, as low as 0.1 torr.

In an aspect, the composite of the first electrode has a particular capacity for absorbing target gas (e.g., $CO_2$). For example, the composite can have an absorption capacity of at least 0.01 mole per square meter (mol per $m^2$), at least 0.02 mol per $m^2$, at least 0.05 mol per $m^2$, or more. In an aspect, the composite can have an absorption capacity of less than or equal to 0.2 mol per $m^2$, less than or equal to 0.08 mol per $m^2$, less than or equal to 0.05 mol per $m^2$, less than or equal to 0.03 mol per $m^2$, or less. For example, the composite can have an absorption capacity of at least 0.01 mol per $m^2$ and less than or equal to 0.2 mol per $m^2$, or at least 0.02 mol per $m^2$ and less than or equal to 0.08 mol per $m^2$.

In an aspect the composite of the first electrode can have a particular surface area that is exposed to the gas mixture, for example, of greater than or equal to 5 $cm^2$, greater than or equal to 8 $cm^2$, greater than or equal to 10 $cm^2$, or up to 10 $cm^2$, up to 20 $cm^2$ or more.

Various components of a system, such as the electrodes (e.g., negative electrode, positive electrodes), power source, electrolyte, separator, container, circuitry, insulating material, and the like can be fabricated by those of ordinary skill in the art from any of a variety of components. Components can be molded, machined, extruded, pressed, isopressed, printed, infiltrated, coated, in green or fired states, or formed by any other suitable technique.

The electrodes described herein (e.g., negative electrode, positive electrodes) can be of any suitable size or shape. Non-limiting examples of shapes include sheets, cubes, cylinders, hollow tubes, spheres, and the like. The electrodes may be of any suitable size, depending on the application for which they are used (e.g., separating gases from ventilated air, direct air capture, etc.). Additionally, the electrode can comprise a means to connect the electrode to another electrode, a power source, and/or another electrical device. Those of ordinary skill in the art are readily aware of techniques for forming components of system herein.

Various electrical components of system may be in electrical communication with at least one other electrical component by a means for connecting. A means for connecting can be any material that allows the flow of electricity to occur between a first component and a second component. A non-limiting example of a means for connecting two electrical components is a wire comprising a conductive material (e.g., copper, silver, etc.). In an aspect, the system can comprise electrical connectors between two or more components (e.g., a wire and an electrode). In an aspect, a wire, electrical connector, or other means for connecting can be selected such that the resistance of the material is low. In as aspect, the resistances can be substantially less than the resistance of the electrodes, electrolyte, or other components of the system.

Electrochemical cells and gas separation systems of the present disclosure can further be as described in U.S. patent application Ser. No. 16/659,398, the contents of which is incorporated by reference in its entirety for all purposes.

The electrochemical cells, systems, and methods described herein can be implemented in a variety of applications. The number of electrochemical cells or sets of cells can be scaled to the requirements of a particular application as needed. The following aspects provide several non-limiting examples of applications. In an aspect, the systems and methods described herein can be for removing a target gas (e.g., $CO_2$) from ambient air, as well as enclosed spaces such as airtight building, car cabins—reducing the heating cost of incoming air for ventilation—and submarines and space capsules, where an increase in $CO_2$ levels could be catastrophic. In aspects directed to the electrical power industry, they can be used for capturing carbon dioxide post-combustion at varying concentrations. In an aspect, the systems and methods are suitable for separate target gases from industrial flue gas or industrial process gas.

Also, they can be used for capturing sulfur dioxide and other gases from flue gas. In aspects directed to the oil and gas industry, the disclosed systems and methods can be used for capturing carbon dioxide and other gases from various processes and diverting them for downstream compression or processing. The disclosed systems and methods can be applied to capture carbon dioxide from burning natural gas used to heat the greenhouses in mild and cold climates, then diverting the captured dioxide into the greenhouse for the plants to use in photosynthesis, i.e., to feed the plants.

This disclosure is further illustrated by the following examples, which are non-limiting.

EXAMPLES

Synthesis of a Poly(Naphthoquinone) from a Dibromo Precursor

A sealable 100 mL tube was charged under $N_2$ with 1.0 g 2,3-dibromo-1,4-napthoquinone, 1.04 g 1,4-benzenediboronic acid bis(pinacol) ester, and 180 mg $Pd(PPh_3)_4$. 30 mL DMF was added, followed by 6 mL 2M aqueous $K_2CO_3$, and the mixture was degassed by sparging with $N_2$ for 20 min. The tube was sealed and heated to 100° C. for 72 hours. The reaction mixture was then cooled to room temperature, diluted with water and dichloromethane, and neutralized with 1M HCl. The organic phase was washed three times with water, dried with $MgSO_4$, and the solvent was removed under reduced pressure. The resulting solid was dissolved in a minimum of dichloromethane, precipitated with a tenfold excess of hexanes, and centrifuged. The resulting pellet was redissolved in a minimum of dichloromethane, precipitated with a threefold excess of methanol, and centrifuged. The resulting pellet was dried to yield the product poly(phenylnaphthoquinone) as a yellow solid.

Synthesis of a Poly(Naphthoquinone) from a Diiodo Precursor

A sealable 100 mL tube was charged under $N_2$ with 410 mg 2,3-diiodo-1,4-napthoquinone, 330 mg 1,4-benzenediboronic acid bis(pinacol) ester, and 12 mg $Pd(OAc)_2$. 24 mL 1,4-dioxane was added, followed by 6 mL 2M aqueous $K_2CO_3$. The tube was sealed and heated to 50° C. for 36 hours. The reaction mixture was then cooled to room temperature, diluted with water and dichloromethane, and neutralized with 1M HCl. The organic phase was washed three times with water, dried with $MgSO_4$, and the solvent was removed under reduced pressure. The resulting solid was dissolved in a minimum of dichloromethane, precipitated with a tenfold excess of hexanes, and centrifuged. The resulting pellet was redissolved in a minimum of dichloromethane, precipitated with a threefold excess of methanol, and centrifuged. The resulting pellet was dried to yield the product poly(phenylnaphthoquinone) as a yellow solid. The poly(phenylnaphthoquinone) was characterized using gel permeation chromatography (GPC) in tetrahydrofuran relative to polystyrene standards and revealed a number average molecular weight (Mn) of 1537 Daltons, a weight average molecular weight (Mw) of 2067 Daltons and a dispersity of 1.34.

Synthesis of a Cyano-Functionalized Poly(Naphthoquinone) from a Diiodo Precursor A sealable 100 mL tube was charged under $N_2$ with 182 mg 5-cyano-2,3-diiodo-1,4-napthoquinone, 138 mg 1,4-benzenediboronic acid bis(pinacol) ester, and 5 mg $Pd(OAc)_2$. 15 mL 1,4-dioxane was added, followed by 5 mL 0.5 M aqueous $K_3PO_4$. The tube was sealed and heated to 50° C. for 24 hours. The reaction mixture was then cooled to room temperature, diluted with water and dichloromethane, and neutralized with 1M HCl. The organic phase was washed three times with water, dried with $MgSO_4$, and the solvent was removed under reduced pressure. The resulting solid was dissolved in a minimum of dichloromethane, precipitated with a tenfold excess of hexanes, and centrifuged. The resulting pellet was redissolved in a minimum of dichloromethane, precipitated with a threefold excess of methanol, and centrifuged. The resulting pellet was dried to yield the product cyano-functionalized poly(phenylnaphthoquinone) as a yellow-brown solid. The cyano-functionalized poly(phenylnaphthoquinone) was characterized using gel permeation chromatography (GPC) in tetrahydrofuran relative to polystyrene standards and revealed a number average molecular weight (Mn) of 1016 Daltons, a weight average molecular weight (Mw) of 1226 Daltons and a dispersity of 1.21.

Synthesis of a Polybenzoquinone from a Diiodo Precursor

A 100 mL three-neck flask with a stirbar was charged under $N_2$ with 2,3-diiodo-5,6-dimethyl-1,4-benzoquinone (388 mg, 1 mmol), 9,9-dimethylfluorene-2,7-diboronic acid bis-pinacol ester (446 mg, 1 mmol), palladium acetate (22 mg, 0.1 mmol) and 1,4-dioxane (30 mL). The solution was degassed by sparging $N_2$, and a solution of $K_3PO_4$ (1.27 g, 6 mmol) in water (10 mL) was added. The stirring reaction mixture was heated to 100° C. for 4 hours, then cooled to room temperature and added dropwise to 200 mL rapidly stirring MeOH. The resulting precipitate was collected by suction filtration, washed with MeOH and hexanes, then dried under vacuum to yield the product poly(phenylbenzoquinone) as an orange-brown solid.

This disclosure further encompasses the following aspects.

Aspect 1: A quinone-containing poly(arylene) comprising repeating units of at least one of formulas (I) to (VI)

wherein $R^1$, $R^2$, $R^3$, $R^4$, $R^6$ and $R^7$ are independently at each occurrence hydrogen, halogen, a $C_{1-30}$ alkyl group, a $C_{1-30}$ alkoxy group, a poly($C_{1-30}$ alkylene oxide) group; a $C_{3-30}$ cycloalkyl group, a $C_{3-30}$ branched alkyl group, a $C_{6-30}$ aryl group, a $C_{3-30}$ heteroaryl group, a $C_{1-30}$ fluoroalkyl group, a nitrile group, a nitro group, a hydroxyl group, a carboxylic acid group, a thiol group, or a vinyl group; $R^8$ and $R^9$ are independently at each occurrence hydrogen, halogen, a $C_{1-30}$ alkyl group, a $C_{1-30}$ alkoxy group, a poly($C_{1-30}$ alkylene oxide) group; a $C_{3-30}$ cycloalkyl group, a $C_{3-30}$ branched alkyl group, a $C_{6-30}$ aryl group, a $C_{3-30}$ heteroaryl group, a $C_{1-30}$ fluoroalkyl group, a nitrile group, a nitro group, a hydroxyl group, a carboxylic acid group, a thiol group, or a vinyl group; and Ar is a substituted or unsubstituted $C_{6-20}$ arylene group, preferably a substituted or unsubstituted phenylene group or a substituted or unsubstituted 9,9-di($C_{1-12}$ alkyl)fluorene group.

Aspect 2: The quinone-containing poly(arylene) of aspect 1, wherein n is 1 and Ar is a substituted or unsubstituted phenylene group, and the quinone-containing poly(arylene) comprises repeating units of at least one of formulas (Ia) to (VIa)

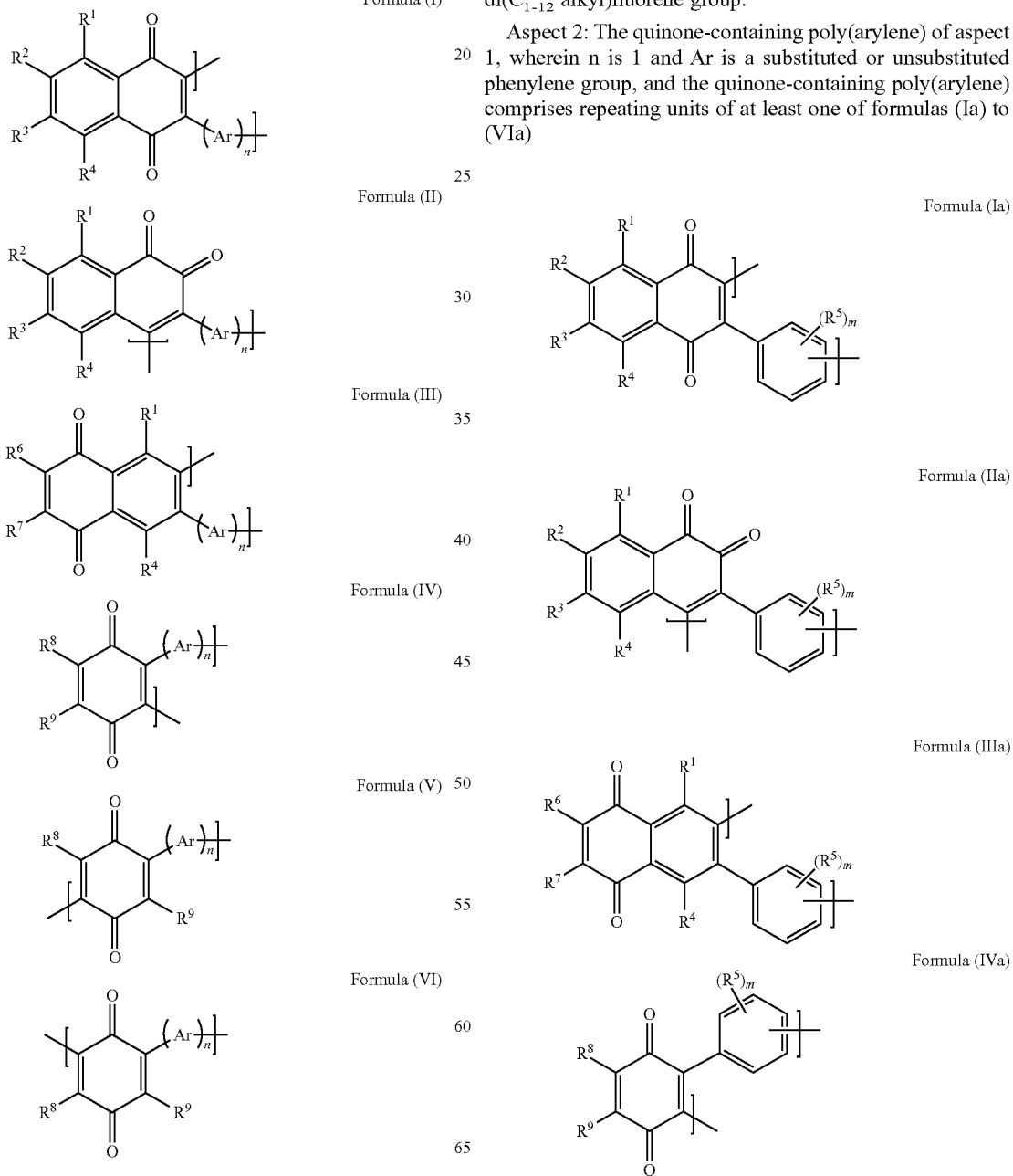

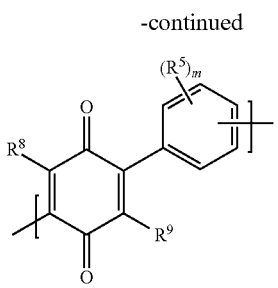

Formula (Va)

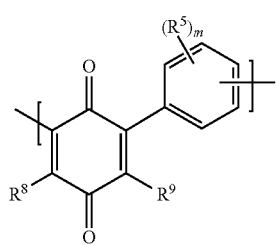

Formula (VIa)

wherein $R^1$, $R^2$, $R^3$, $R^4$, $R^6$ and $R^7$ are independently at each occurrence hydrogen, halogen, a $C_{1-30}$ alkyl group, a $C_{1-30}$ alkoxy group, a poly($C_{1-30}$ alkylene oxide) group; a $C_{3-30}$ cycloalkyl group, a $C_{3-30}$ branched alkyl group, a $C_{6-30}$ aryl group, a $C_{3-30}$ heteroaryl group, a $C_{1-30}$ fluoroalkyl group, a nitrile group, a nitro group, a hydroxyl group, a carboxylic acid group, a thiol group, or a vinyl group; $R^5$ is independently at each occurrence halogen, a $C_{1-30}$ alkyl group, a $C_{1-30}$ alkoxy group, a poly($C_{1-30}$ alkylene oxide) group; a $C_{3-30}$ cycloalkyl group, a $C_{3-30}$ branched alkyl group, a $C_{6-30}$ aryl group, a $C_{3-30}$ heteroaryl group, a $C_{1-30}$ fluoroalkyl group, a nitrile group, a nitro group, a hydroxyl group, a carboxylic acid group, a thiol group, or a vinyl group; $R^8$ and $R^9$ are independently at each occurrence hydrogen, halogen, a $C_{1-30}$ alkyl group, a $C_{1-30}$ alkoxy group, a poly($C_{1-30}$ alkylene oxide) group; a $C_{3-30}$ cycloalkyl group, a $C_{3-30}$ branched alkyl group, a $C_{6-30}$ aryl group, a $C_{3-30}$ heteroaryl group, a $C_{1-30}$ fluoroalkyl group, a nitrile group, a nitro group, a hydroxyl group, a carboxylic acid group, a thiol group, or a vinyl group; and m is 0 to 4.

Aspect 3: The quinone-containing poly(arylene) of aspect 2, wherein the quinone-containing poly(arylene) comprises repeating units according to at least one of Formula (Ia) and (IIa), wherein each of $R^1$, $R^2$, $R^3$, and $R^4$ is hydrogen and m is 0.

Aspect 4: The quinone-containing poly(arylene) of aspect 2, wherein the quinone-containing poly(arylene) comprises repeating units according to Formula (IIIa), wherein $R^6$ and $R^7$ are nitrile and m is 0.

Aspect 5: The quinone-containing poly(arylene) of aspect 2, wherein the quinone-containing poly(arylene) comprises repeating units according to at least one of Formula (IVa), (Va), and (VIa), wherein $R^8$ and $R^9$ are $C_{1-6}$ alkyl groups, preferably methyl groups, and m is 0.

Aspect 6: The quinone-containing poly(arylene) of any of aspects 1 to 5, wherein the quinone-containing poly(arylene) comprises at least 5 repeating units according to at least one of Formulas (I)-(VI), preferably at least 10 repeating units according to at least one of Formulas (I)-(VI).

Aspect 7: The quinone-containing poly(arylene) of any of aspects 1 to 6, wherein at least 50 mole percent, or at least 75 mole percent, or at least 80 mole percent, or at least 90 mole percent, or at least 95 mole percent, or at least 99 mole percent of the repeating units are according to Formula (I), (II), (III), (IV), (V), or (VI), preferably wherein the quinone-containing poly(arylene) is a homopolymer consisting of repeating units according to Formula (I), (II), (III), (IV), (V), or (VI).

Aspect 8: The quinone-containing poly(arylene) of any of aspects 1 to 7, wherein the quinone-containing poly(arylene) has a binding constant with carbon dioxide of at least $10^1$ $M^{-1}$, preferably $10^1$ to $10^{20}$ $M^{-1}$, more preferably $10^1$ to $10^{20}$ $M^{-1}$.

Aspect 9: The quinone-containing poly(arylene) of any of aspects 1 to 8, wherein the quinone-containing poly(arylene) has a number average molecular weight of 10,000 to 200,000 grams per mole, preferably 10,000 to 100,000 grams per mole, more preferably 10,000 to 75,000 grams per mole, even more preferably 20,000 to 50,000 grams per mole.

Aspect 10: A method of making the quinone-containing poly(arylene) of any of aspects 1 to 9, the method comprising combining a dihalogenated naphthoquinone, a dihalogenated benzoquinone, or a combination thereof; and a substituted or unsubstituted $C_{6-20}$ aryl diboronic acid or diboronic ester; in the presence of a palladium catalyst under conditions effective to provide the quinone-containing poly(arylene).

Aspect 11: A composite comprising the quinone-containing poly(arylene) of any of aspects 1 to 9 disposed on a substrate.

Aspect 12: The composite of aspect 11, wherein the substrate comprises a carbonaceous material.

Aspect 13: An electrode assembly comprising: a porous separator; and the composite of aspect 11 or 12.

Aspect 14: An electrochemical cell comprising the composite of aspects 11 or 12.

Aspect 15: The electrochemical cell of aspects 14, comprising: a first electrode comprising the composite of aspects 11 or 12; a second electrode comprising a complementary electroactive composite layer; and a first separator between the first electrode and the second electrode.

Aspect 16: The electrochemical cell of aspects 14 to 15, wherein the composite further comprises an electrolyte.

Aspect 17: A gas separation system comprising: a plurality of electrochemical cells in fluid communication with a gas inlet and a gas outlet, wherein each of the plurality of electrochemical cells is according to any of aspects 14 to 16.

Aspect 18: An energy storage device comprising the quinone-containing poly(arylene) of any of aspects 1 to 9, the composite of aspects 11 or 12, or the electrochemical cell of any of aspects 14 to 16.

Aspect 19: An electrochromic device comprising the quinone-containing poly(arylene) of any of aspects 1 to 9, the composite of aspect 11 or 12, or the electrochemical cell of any of aspects 14 to 16.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other. "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. Reference throughout the specification to "an aspect" means that a particular element described in connection with the aspect is included in at least one aspect described herein, and may or may not be present in other aspects. The term "combination thereof" as used herein includes one or more of the listed elements, and is open, allowing the presence of one or more like elements not named. In addition, it is to be understood that the described elements may be combined in any suitable manner in the various aspects.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. The term "alkyl" means a branched or straight chain, saturated aliphatic hydrocarbon group, e.g., methyl, ethyl, n-propyl, i-propyl, n-butyl, s-butyl, t-butyl, n-pentyl, s-pentyl, and n- and s-hexyl. "Alkenyl" means a straight or branched chain, monovalent hydrocarbon group having at least one carbon-carbon double bond (e.g., ethenyl (—HC=$CH_2$)). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene (—$CH_2$—) or, propylene (—$(CH_2)_3$-)). "Cycloalkylene" means a divalent cyclic alkylene group, —$C_nH_{2n-x}$, wherein x is the number of hydrogens replaced by cyclization(s). "Cycloalkenyl" means a monovalent group having one or more rings and one or more carbon-carbon double bonds in the ring, wherein all ring members are carbon (e.g., cyclopentyl and cyclohexyl). "Aryl" means an aromatic hydrocarbon group containing the specified number of carbon atoms, such as phenyl, tropone, indanyl, or naphthyl. "Arylene" means a divalent aryl group. "Alkylarylene" means an arylene group substituted with an alkyl group. "Arylalkylene" means an alkylene group substituted with an aryl group (e.g., benzyl). The prefix "halo" means a group or compound including one more of a fluoro, chloro, bromo, or iodo substituent. A combination of different halo atoms (e.g., bromo and fluoro), or only chloro atoms can be present. The prefix "hetero" means that the compound or group includes at least one ring member that is a heteroatom (e.g., 1, 2, or 3 heteroatom(s)), wherein the heteroatom(s) is each independently N, O, S, Si, or P. "Substituted" means that the compound or group is substituted with at least one (e.g., 1, 2, 3, or 4) substituents that can each independently be a $C_{1-9}$ alkoxy, a $C_{1-9}$ haloalkoxy, a nitro (—$NO_2$), a cyano (—CN), a $C_{1-6}$ alkyl sulfonyl (—S(=O)$_2$-alkyl), a $C_{6-12}$ aryl sulfonyl (—S(=O)$_2$-aryl), a thiol (—SH), a thiocyano (—SCN), a tosyl ($CH_3C_6H_4SO_2$—), a $C_{3-12}$ cycloalkyl, a $C_{2-12}$ alkenyl, a $C_{5-12}$ cycloalkenyl, a $C_{6-12}$ aryl, a $C_{7-13}$ arylalkylene, a $C_{4-12}$ heterocycloalkyl, and a $C_{3-12}$ heteroaryl instead of hydrogen, provided that the substituted atom's normal valence is not exceeded. The number of carbon atoms indicated in a group is exclusive of any substituents. For example —$CH_2CH_2CN$ is a $C_2$ alkyl group substituted with a nitrile.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A quinone-containing poly(arylene) comprising repeating units of at least one of formulas (I) to (III)

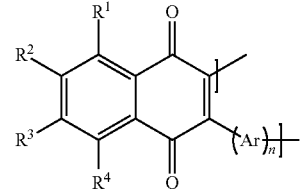

Formula (I)

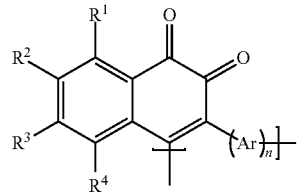

Formula (II)

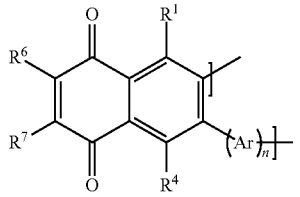

Formula (III)

wherein $R^1$, $R^2$, $R^3$, $R^4$, $R^6$ and $R^7$ are independently at each occurrence hydrogen, halogen, a $C_{1-30}$ alkyl group, a $C_{1-30}$ alkoxy group, a poly($C_{1-30}$ alkylene oxide) group; a $C_{3-30}$ cycloalkyl group, a $C_{3-30}$ branched alkyl group, a $C_{6-30}$ aryl group, a $C_{3-30}$ heteroaryl group, a $C_{1-30}$ fluoroalkyl group, a nitrile group, a nitro group, a hydroxyl group, a carboxylic acid group, a thiol group, or a vinyl group; and Ar is a substituted or unsubstituted $C_{6-20}$ arylene group; and n is 0 or 1.

2. The quinone-containing poly(arylene) of claim 1, wherein n is 1 and Ar is a substituted or unsubstituted phenylene group, and the quinone-containing poly(arylene) comprises repeating units of at least one of formulas (Ia) to (IIIa)

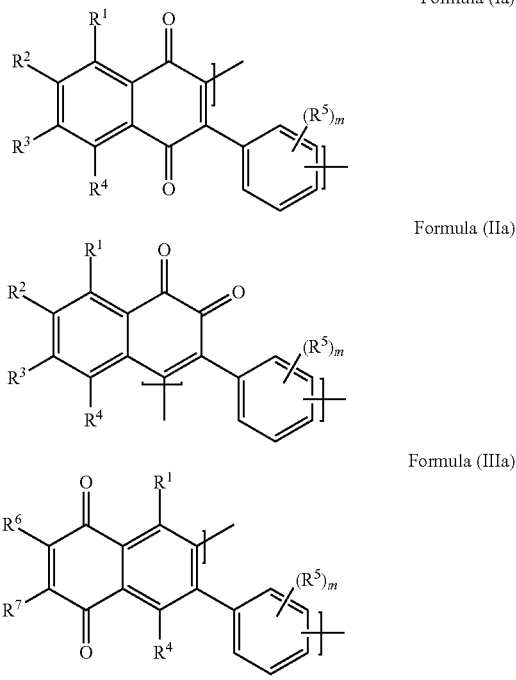

Formula (Ia)

Formula (IIa)

Formula (IIIa)

wherein $R^1$, $R^2$, $R^3$, $R^4$, $R^6$ and $R^7$ are independently at each occurrence hydrogen, halogen, a $C_{1-30}$ alkyl group, a $C_{1-30}$ alkoxy group, a poly($C_{1-30}$ alkylene oxide) group; a $C_{3-30}$ cycloalkyl group, a $C_{3-30}$ branched alkyl group, a $C_{6-30}$ aryl group, a $C_{3-30}$ heteroaryl group, a $C_{1-30}$ fluoroalkyl group, a nitrile group, a nitro group, a hydroxyl group, a carboxylic acid group, a thiol group, or a vinyl group;

$R^5$ is independently at each occurrence halogen, a $C_{1-30}$ alkyl group, a $C_{1-30}$ alkoxy group, a poly($C_{1-30}$ alkylene oxide) group; a $C_{3-30}$ cycloalkyl group, a $C_{3-30}$ branched alkyl group, a $C_{6-30}$ aryl group, a $C_{3-30}$ heteroaryl group, a $C_{1-30}$ fluoroalkyl group, a nitrile group, a nitro group, a hydroxyl group, a carboxylic acid group, a thiol group, or a vinyl group; and m is 0 to 4.

3. The quinone-containing poly(arylene) of claim 2, wherein the quinone-containing poly(arylene) comprises repeating units according to at least one of Formula (Ia) and (IIa), wherein each of $R^1$, $R^2$, $R^3$, and $R^4$ is hydrogen and m is 0.

4. The quinone-containing poly(arylene) of claim 2, wherein the quinone-containing poly(arylene) comprises repeating units according to Formula (IIIa), wherein $R^6$ and $R^7$ are nitrile and m is 0.

5. The quinone-containing poly(arylene) of claim 1, wherein the quinone-containing poly(arylene) comprises at least 5 repeating units according to at least one of Formulas (I)-(III).

6. The quinone-containing poly(arylene) of claim 1, wherein at least 50 mole percent of the repeating units are according to Formula (I), (II), or (III).

7. The quinone-containing poly(arylene) of claim 1, wherein the quinone-containing poly(arylene) has a binding constant with carbon dioxide of at least $10^1$ $M^{-1}$.

8. The quinone-containing poly(arylene) of claim 1, wherein the quinone-containing poly(arylene) has a number average molecular weight of 1,000 to 200,000 grams per mole.

9. A composite comprising the quinone-containing poly(arylene) of claim 1 disposed on a substrate.

10. The composite of claim 9, wherein the substrate comprises a carbonaceous material.

11. An electrode assembly comprising:
a porous separator; and
the composite of claim 9.

12. An electrochemical cell comprising the composite of claim 9.

13. The electrochemical cell of claim 12, comprising:
a first electrode comprising the composite of claim 11;
a second electrode comprising a complementary electroactive composite layer; and
a first separator between the first electrode and the second electrode.

14. The electrochemical cell of claim 12, wherein the composite further comprises an electrolyte.

15. An energy storage device comprising the quinone-containing poly(arylene) of claim 1.

16. The quinone-containing poly(arylene) of claim 1, wherein Ar is a substituted or unsubstituted phenylene group, a substituted or unsubstituted fluorene group, or a combination thereof.

17. A method of making the quinone-containing poly(arylene) of claim 2, the method comprising combining
a dihalogenated naphthoquinone; and
a benzene diboronic acid or a benzene diboronic ester; in the presence of a palladium catalyst under conditions effective to provide the quinone-containing poly(arylene).

18. A gas separation system comprising:
a plurality of electrochemical cells in fluid communication with a gas inlet and a gas outlet, wherein each of the plurality of electrochemical cells comprises
a first electrode comprising a composite;
a second electrode comprising a complementary electroactive composite layer; and
a first separator between the first electrode and the second electrode;
wherein the composite of the first electrode comprises a quinone-containing poly(arylene) disposed on a substrate, the quinone-containing poly(arylene) comprising
repeating units of at least one of formulas (I) to (VI)

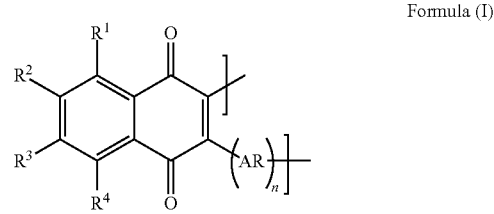

Formula (I)

-continued

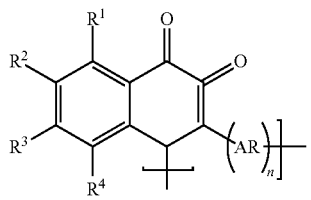
Formula (II)

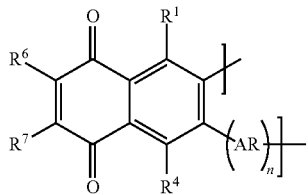
Formula (III)

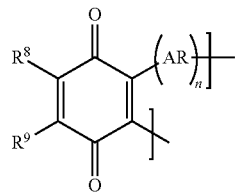
Formula (IV)

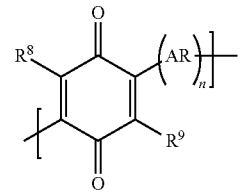
Formula (V)

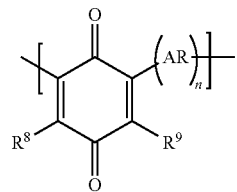
Formula (VI)

wherein $R^1$, $R^2$, $R^3$, $R^4$, $R^6$ and $R^7$ are independently at each occurrence hydrogen, halogen, a $C_{1-30}$ alkyl group, a $C_{1-30}$ alkoxy group, a poly($C_{1-30}$ alkylene oxide) group; a $C_{3-30}$ cycloalkyl group, a $C_{3-30}$ branched alkyl group, a $C_{6-30}$ aryl group, a $C_{3-30}$ heteroaryl group, a $C_{1-30}$ fluoroalkyl group, a nitrile group, a nitro group, a hydroxyl group, a carboxylic acid group, a thiol group, or a vinyl group;

$R^8$ and $R^9$ are independently at each occurrence hydrogen, halogen, a $C_{1-30}$ alkyl group, a $C_{1-30}$ alkoxy group, a poly($C_{1-30}$ alkylene oxide) group; a $C_{3-30}$ cycloalkyl group, a $C_{3-30}$ branched alkyl group, a $C_{6-30}$ aryl group, a $C_{3-30}$ heteroaryl group, a $C_{1-30}$ fluoroalkyl group, a nitrile group, a nitro group, a hydroxyl group, a carboxylic acid group, a thiol group, or a vinyl group;

Ar is a substituted or unsubstituted $C_{6-20}$ arylene group; and n is 0 or 1.

19. An electrochromic device comprising a quinone-containing poly(arylene) comprising repeating units of at least one of formulas (I) to (IVI)

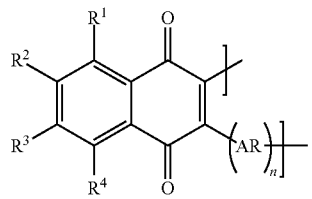
Formula (I)

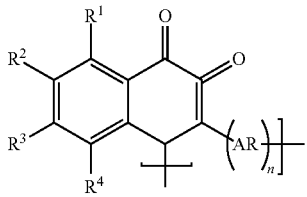
Formula (II)

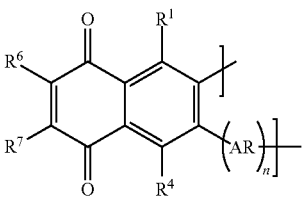
Formula (III)

wherein $R^1$, $R^2$, $R^3$, $R^4$, $R^6$ and $R^7$ are independently at each occurrence hydrogen, halogen, a $C_{1-30}$ alkyl group, a $C_{1-30}$ alkoxy group, a poly($C_{1-30}$ alkylene oxide) group; a $C_{3-30}$ cycloalkyl group, a $C_{3-30}$ branched alkyl group, a $C_{6-30}$ aryl group, a $C_{3-30}$ heteroaryl group, a $C_{1-30}$ fluoroalkyl group, a nitrile group, a nitro group, a hydroxyl group, a carboxylic acid group, a thiol group, or a vinyl group;

Ar is a substituted or unsubstituted $C_{6-20}$ arylene group; and n is 0 or 1.

20. A quinone-containing poly(arylene) comprising at least 5 repeating units of formula (IV)

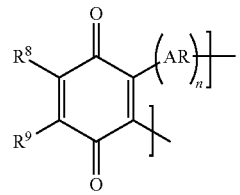
Formula (IV)

wherein $R^8$ and $R^9$ are independently at each occurrence hydrogen, halogen, a $C_{1-30}$ alkyl group, a $C_{1-30}$ alkoxy group, a poly($C_{1-30}$ alkylene oxide) group; a $C_{3-30}$ cycloalkyl group, a $C_{3-30}$ branched alkyl group, a $C_{6-30}$ aryl group, a $C_{3-30}$ heteroaryl group, a $C_{1-30}$ fluoroalkyl group, a nitrile group, a nitro group, a hydroxyl group, a carboxylic acid group, a thiol group, or a vinyl group;

Ar a substituted or unsubstituted $C_{6-20}$ arylene group; and n is 0 or 1.

21. A quinone-containing poly(arylene) comprising repeating units of formula (IV)

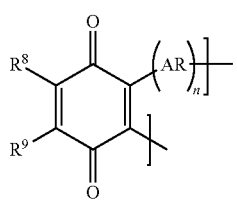

Formula (IV)

wherein $R^8$ and $R^9$ are independently at each occurrence hydrogen, halogen, a $C_{1-30}$ alkyl group, a $C_{1-30}$ alkoxy group, a poly($C_{1-30}$ alkylene oxide) group; a $C_{3-30}$ cycloalkyl group, a $C_{3-30}$ branched alkyl group, a $C_{6-30}$ aryl group, a $C_{3-30}$ heteroaryl group, a $C_{1-30}$ fluoroalkyl group, a nitrile group, a nitro group, a hydroxyl group, a carboxylic acid group, a thiol group, or a vinyl group;

Ar is a substituted or unsubstituted phenylene group, a substituted or unsubstituted fluorene group, a substituted or unsubstituted thiophene group, or a combination thereof; and n is 1.

22. An energy storage device comprising the quinone-containing poly(arylene) of claim 21.

23. A quinone-containing poly(arylene) comprising repeating units of at least one of formulas (I) to (III) and (VI)

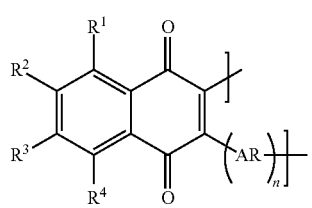

Formula (I)

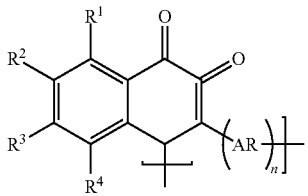

Formula (II)

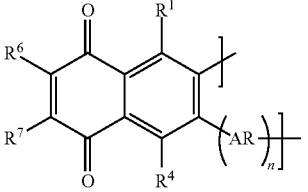

Formula (III)

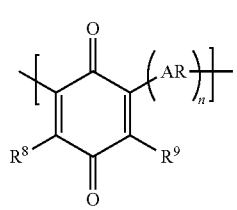

Formula (VI)

wherein $R^1$, $R^2$, $R^3$, $R^4$, $R^6$ and $R^7$ are independently at each occurrence hydrogen, halogen, a $C_{1-30}$ alkyl group, a $C_{1-30}$ alkoxy group, a poly($C_{1-30}$ alkylene oxide) group; a $C_{3-30}$ cycloalkyl group, a $C_{3-30}$ branched alkyl group, a $C_{6-30}$ aryl group, a $C_{3-30}$ heteroaryl group, a $C_{1-30}$ fluoroalkyl group, a nitrile group, a nitro group, a hydroxyl group, a carboxylic acid group, a thiol group, or a vinyl group;

$R^8$ and $R^9$ are independently at each occurrence hydrogen, halogen, a $C_{1-30}$ alkyl group, a $C_{1-30}$ alkoxy group, a poly($C_{1-30}$ alkylene oxide) group; a $C_{3-30}$ cycloalkyl group, a $C_{3-30}$ branched alkyl group, a $C_{6-30}$ aryl group, a $C_{3-30}$ heteroaryl group, a $C_{1-30}$ fluoroalkyl group, a nitrile group, a nitro group, a hydroxyl group, a carboxylic acid group, a thiol group, or a vinyl group;

Ar is a substituted or unsubstituted thiophene group; and n is 1.

24. A quinone-containing poly(arylene) comprising repeating units of formula (VI)

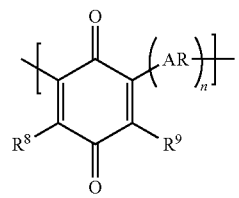

Formula (VI)

wherein $R^8$ and $R^9$ are independently at each occurrence hydrogen, halogen, a $C_{1-30}$ alkyl group, a $C_{1-30}$ alkoxy group, a poly($C_{1-30}$ alkylene oxide) group; a $C_{3-30}$ cycloalkyl group, a $C_{3-30}$ branched alkyl group, a $C_{6-30}$ aryl group, a $C_{3-30}$ heteroaryl group, a $C_{1-30}$ fluoroalkyl group, a nitrile group, a nitro group, a hydroxyl group, a carboxylic acid group, a thiol group, or a vinyl group;

Ar is a substituted or unsubstituted $C_{6-20}$ arylene group; and n is 1.

25. The quinone-containing poly(arylene) of claim 24, wherein n is 1 and Ar is a substituted or unsubstituted phenylene group, and the quinone-containing poly(arylene) comprises repeating units of formula (VIa)

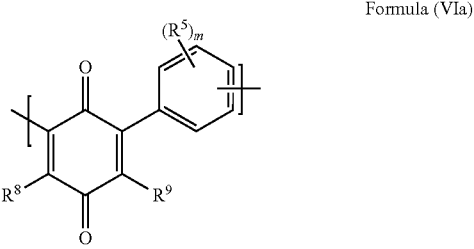

Formula (VIa)

wherein $R^5$ is independently at each occurrence halogen, a $C_{1-30}$ alkyl group, a $C_{1-30}$ alkoxy group, a poly($C_{1-30}$ alkylene oxide) group; a $C_{3-30}$ cycloalkyl group, a $C_{3-30}$ branched alkyl group, a $C_{6-30}$ aryl group, a $C_{3-30}$ heteroaryl group, a $C_{1-30}$ fluoroalkyl group, a nitrile group, a nitro group, a hydroxyl group, a carboxylic acid group, a thiol group, or a vinyl group;

$R^8$ and $R^9$ are independently at each occurrence hydrogen, halogen, a $C_{1-30}$ alkyl group, a $C_{1-30}$ alkoxy group, a poly($C_{1-30}$ alkylene oxide) group; a $C_{3-30}$ cycloalkyl group, a $C_{3-30}$ branched alkyl group, a $C_{6-30}$ aryl group, a $C_{3-30}$ heteroaryl group, a $C_{1-30}$ fluoroalkyl group, a nitrile group, a nitro group, a hydroxyl group, a carboxylic acid group, a thiol group, or a vinyl group; and m is 0 to 4.

26. The quinone-containing poly(arylene) of claim 25, wherein $R^8$ and $R^9$ are $C_{1-6}$ alkyl groups.

27. An electrochromic device comprising a quinone-containing poly(arylene) comprising repeating units of at least one of formulas (IV) or (VI)

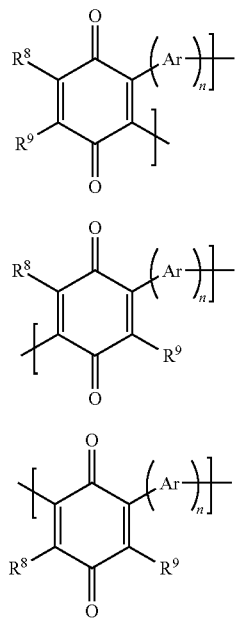

Formula (V)

Formula (V)

Formula (VI)

wherein $R^8$ and $R^9$ are independently at each occurrence hydrogen, halogen, a $C_{1-30}$ alkyl group, a $C_{1-30}$ alkoxy group, a poly($C_{1-30}$ alkylene oxide) group; a $C_{3-30}$ cycloalkyl group, a $C_{3-30}$ branched alkyl group, a $C_{6-30}$ aryl group, a $C_{3-30}$ heteroaryl group, a $C_{1-30}$ fluoroalkyl group, a nitrile group, a nitro group, a hydroxyl group, a carboxylic acid group, a thiol group, or a vinyl group;

Ar is a substituted or unsubstituted $C_{6-20}$ arylene group; and n is 1.

28. An energy storage device comprising a quinone-containing poly(arylene) comprising repeating units of at least one of formulas (V) or (VI)

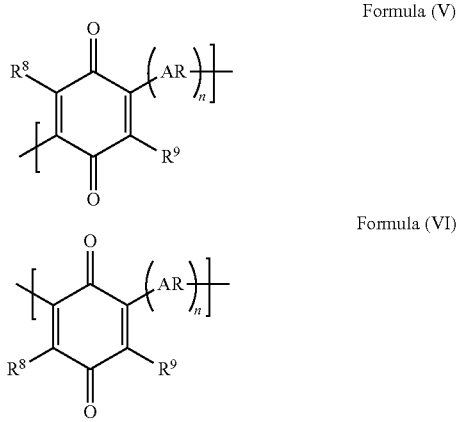

Formula (V)

Formula (VI)

wherein $R^8$ and $R^9$ are independently at each occurrence hydrogen, halogen, a $C_{1-30}$ alkyl group, a $C_{1-30}$ alkoxy group, a poly($C_{1-30}$ alkylene oxide) group; a $C_{3-30}$ cycloalkyl group, a $C_{3-30}$ branched alkyl group, a $C_{6-30}$ aryl group, a $C_{3-30}$ heteroaryl group, a $C_{1-30}$ fluoroalkyl group, a nitrile group, a nitro group, a hydroxyl group, a carboxylic acid group, a thiol group, or a vinyl group;

Ar is a substituted or unsubstituted $C_{6-20}$ arylene group; and n is 1.

* * * * *